United States Patent [19]
Corso et al.

[11] Patent Number: 5,320,123
[45] Date of Patent: Jun. 14, 1994

[54] VALVE WITH DYNAMIC FUNCTION CHECKING CAPABILITY

[75] Inventors: Thomas C. Corso; Wilhelm H. Horlacher; Harry S. Kuhlman, all of Hartford, Conn.

[73] Assignee: Honeywell Inc., Minneapolis, Minn.

[21] Appl. No.: 66,365

[22] Filed: May 24, 1993

[51] Int. Cl.$^5$ .......................................... A15B 13/043
[52] U.S. Cl. ...................................... 137/1; 137/554; 137/625.64
[58] Field of Search ...................... 137/1, 554, 625.64

[56] References Cited

U.S. PATENT DOCUMENTS

| | | | |
|---|---|---|---|
| 4,310,143 | 1/1982 | Determan | 137/625.64 X |
| 4,585,029 | 4/1986 | Harding | 137/625.64 X |
| 5,197,508 | 3/1993 | Gottling et al. | 137/1 |
| 5,244,002 | 9/1993 | Frederick | 137/1 |

*Primary Examiner*—Gerald A. Michalsky
*Attorney, Agent, or Firm*—William D. Lanyi

[57] ABSTRACT

A valve is provided with a means for determining the operability of the valve without causing it to change fluid conduction state. A spool member is axially moveable within a valve housing in response to pressure changes caused by the plunger of a pilot valve. The plunger is moved in response to an electromagnetic field induced by a solenoid coil. The coil is sequentially actuated at ever increasing intervals of time while the movement of the spool member is monitored by observing an output from a magnetically sensitive device which can be affected by the presence of a permanent magnet within its zone of detection. The permanent magnet is attached for movement with the spool member and the magnetically sensitive device, such as a Hall effect element, is attached to a stationary portion of the valve at a predetermined location. When the interval of deactuation of the coil is sufficient to cause the spool member to move the permanent magnet into the zone of detection of the magnetically sensitive device, a signal is provided and the valve is determined to sufficiently move the spool member to indicate its operability. None of the actions described immediately above result in a change in fluid conduction state of the valve.

14 Claims, 6 Drawing Sheets

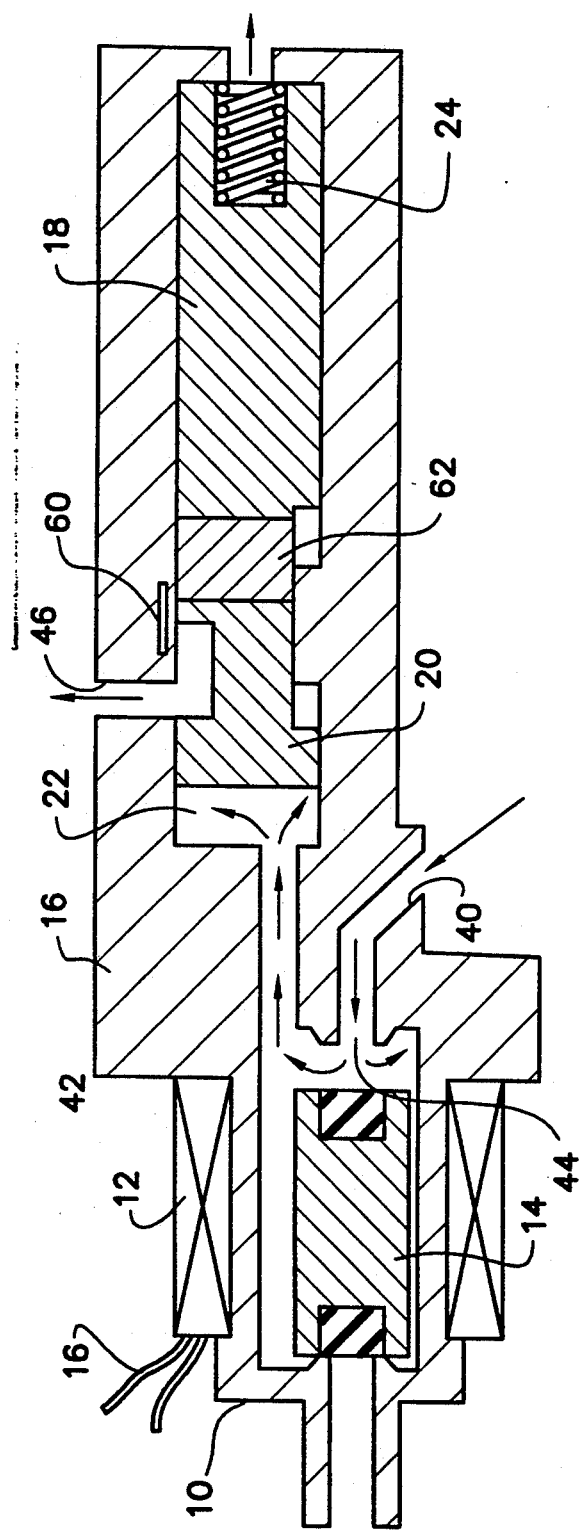
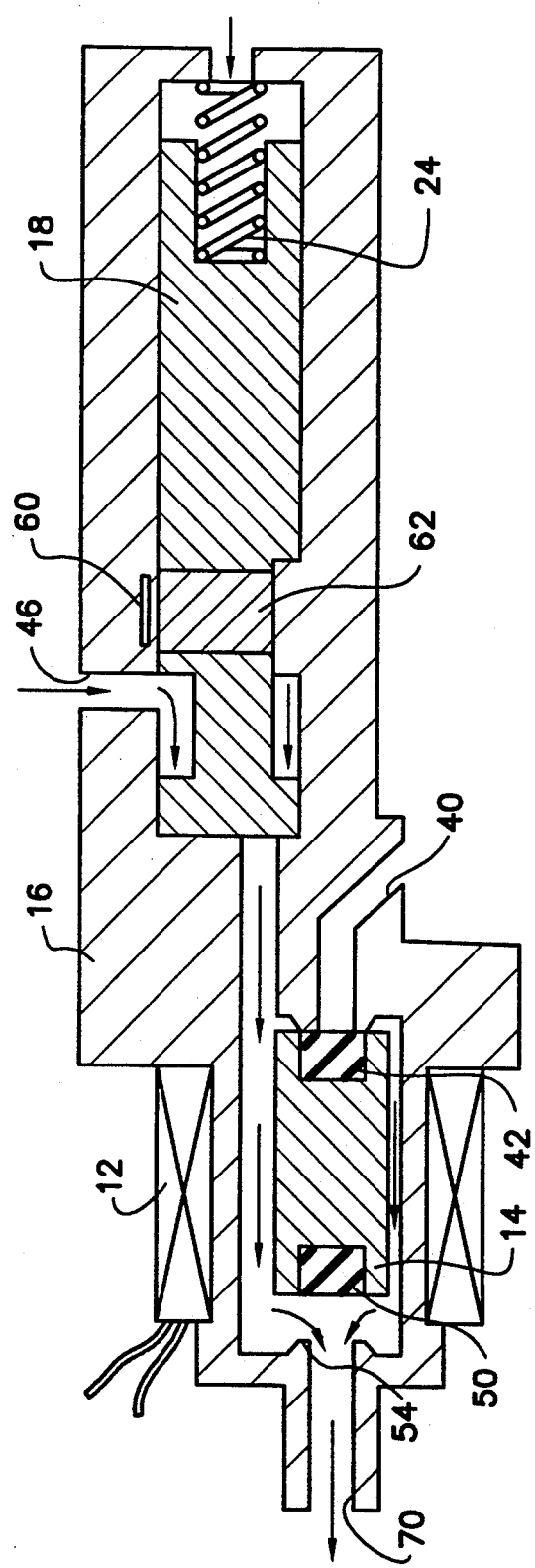
Fig.2
Fig.3

VALVE WITH DYNAMIC FUNCTION CHECKING CAPABILITY

BACKGROUND OF THE INVENTION

1. Field of the Invention

The present invention relates generally to valves and, more particularly, to a valve which is provided with the capability of determining the operative state and condition of the valve without changing its actuation state.

2. Description of the Prior Art

Many different types of valves are known to those skilled in the art. One particular type of known valve is a spool valve in which a spool member is moved axially in response to pressure provided by a pilot valve and the axial movement of the spool member changes the interconnection between various ports formed in a valve body.

In certain applications, valves of the type described above are used in applications where they are intended to remain in a constant state of actuation for very long periods of time. During those extended time periods, the spool member of the valve does not move and the fluid interconnection between valve ports does not change. This continual sedentary state can lead to possible dangerous conditions when the valve is of the fail safe type and the sedentary state is in the actuated position. Under these circumstances, a failure in the valve's ability to return safely to its rest position can lead to disastrous consequences. When a valve, or any other mechanical device, is left in one condition for extended periods of time, the components which are intended to be moveable relative to each other can seize together and become frozen in their actuated position.

As an example of the above problem condition, a valve can comprise a solenoid operated pilot valve which controls the position of a spool member. In the actuated position, an electric current is continually provided to a solenoid coil of the pilot valve which causes a plunger of the pilot valve to move to and remain in an actuation position. This actuation position connects a motor portion of the spool member in fluid communication with a pressure source. This continuous pressure causes the spool member to remain in its actuation position. Both the spool member of the main valve and the plunger of the pilot valve are typically provided with spring return mechanisms that return them to their unactuated positions when the pressure is removed from the spool member because the current is removed from the solenoid coil. If a power failure occurs and the solenoid coil is deprived of electrical current, the valve is designed so that the lack of power will cause the springs in the pilot valve and main valve to urge the plunger and spool member back to their unactuated positions. Applied in this way, a power failure will result in the valve returning to its fail safe condition. Any equipment, such as pneumatic actuators, which are connected to the valve would typically be arranged in such a way that the return of the valve to its fail safe condition would result in all associated equipment being placed in a safe condition. The fail safe techniques described above depend completely on the return of the spool member to its unactuated position in response to the force provided by an internal spring. However, as is well known to those skilled in the art, when a valve is maintained in a constant position for an extremely long period of time, it can possibly remain permanently frozen in that position even after the actuation force provided by the solenoid pilot valve is removed. This seizure of the spool member within the valve housing can result from several causes. First, any two materials that are placed in intimate contact with each other for long periods of time can adhere to each other. This can result from molecular exchange between the materials or the build up of corrosion at the interface between them. In addition, the elastomeric seals which are typically used in valves can adhere to the surface of the spool member with which they are in contact. Regardless of the numerous reasons why the spool member can stick to associated components and remain in its actuated position after the pilot valve solenoid has been de-energized, it should be understood that a failure of this type can be catastrophic. It should also be understood that failures of this type are insidious because they do not become evident until after they occur. A valve which has been in an actuated position for an extended period of time can appear to be in perfect operating condition as long as it is actuated, but it can also be in a condition wherein the spool member is actually seized in its actuated position and will not respond by returning to its unactuated position if a power failure occurs or if the solenoid pilot valve is manually deactuated. These types of latent failures can also be very expensive to detect by manually turning the valve off for a moment and then back on. The process which is controlled by the valve may be one that does not lend itself to manual interruption in this manner.

Another expensive solution to this problem is to provide dual valve configurations in which the failure of one valve will not defeat the fail safe arrangement. However, this technique also has a serious drawback in that a failure of one of two redundant valves will not be readily evident as long as the other one of the two redundant valves is operating properly. This technique therefore merely delays the catastrophic failure.

In view of the above discussion of the problems related to valves which remain in an actuated position for long periods of time, it can be seen that it would be significantly beneficial if a means for testing the operability of an actuated valve is provided wherein the operating state of the valve need not be affected.

SUMMARY OF THE INVENTION

The present invention provides a valve which comprises a spool member that is movable between a first limit of travel in a first direction and a second limit of travel in a second direction. The spool member is disposed within a valve body. The valve also comprises a means for causing the spool member to move a partial distance from the first limit of travel toward the second limit of travel and a means for sensing a movement of the spool member past a predetermined location intermediate first and second positions.

In a preferred embodiment of the present invention, the valve further comprises a pilot valve operatively associated with the spool member, wherein the pilot valve comprises a moveable plunger. In addition, a solenoid coil is provided for moving the plunger between a first position, such as an energized position, and a second position, such as a de-energized position. The energized position urges the spool member to move toward the first position, or limit of travel, and the de-energized position urges the spool member to move toward the second position, or limit of travel. Although the present invention will be described in terms of a valve in which the first position is the energized position and the second position is the de-energized position, it should be clearly understood that the present invention could also be used in conjunction with a valve in which the opposite relationship exists.

In a particularly preferred embodiment of the present invention, the causing means comprises a means for incrementally de-energizing the solenoid coil for sequential increasing intervals until the spool member moves past a predetermined position. The sensing means comprises a Hall element disposed proximate the spool member at the predetermined location and a magnet attached to the spool member.

A preferred embodiment of the present invention comprises a means for repeatedly moving the spool member of the valve a variable preselected distance from a first position towards a second position. It also comprises a means for increasing the variable preselected distance for each successive movement of the spool member and a means for sensing the movement of the spool member past a predetermined location. The moving means comprises a pilot valve operatively associated with the spool member to control an actuation pressure which urges the spool member toward the first position.

BRIEF DESCRIPTION OF THE DRAWINGS

The present invention will be more fully understood from a reading of the Description of the Preferred Embodiment in conjunction with the drawings, in which:

FIGS. 2 and 3 are schematic representations of a typical spool valve used to described the operation of the valve and the present invention;

DESCRIPTION OF THE PREFERRED EMBODIMENT

Figure 1:
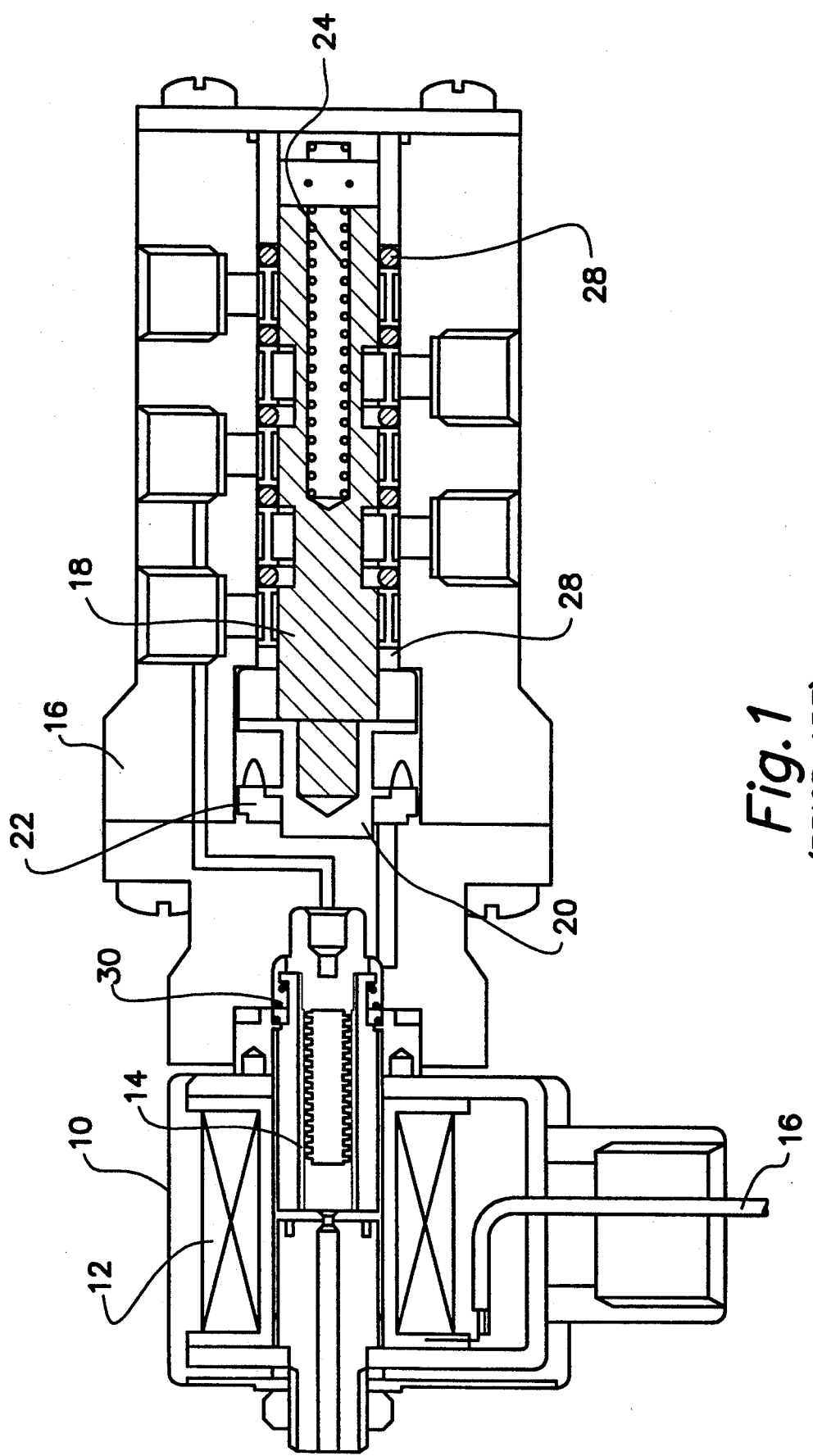
FIG. 1 illustrates a typical spool valve that is known to those skilled in the art.

Throughout the Description of the Preferred Embodiment, like components will be identified by like reference numerals.

FIG. 1 illustrates a spool valve of the type that is well known to those skilled in the art. The valve comprises a pilot valve portion 10 which, in turn, comprises a solenoid coil 12 that provides an electromagnetic field which causes a plunger 14 to move axially along a centerline of the solenoid coil 12. A wire 16 is provided in contact with the coil 12 so that electrical power can be selectively provided to the coil in order to control the position of the plunger 14. As will be described in greater detail below in conjunction with the schematic illustrations of FIGS. 2 and 3, movement of the plunger 14 controls the flow of fluid through the pilot valve 10 toward the valve body 16 in which a spool member 18 is disposed. One end of the spool member 18 is referred to as the motor 20. The flow of fluid from the pilot valve 10 causes an increase in pressure in a front chamber 22 on one side of the motor 20. This increased pressure causes the spool member 18 to move toward the right in FIG. 1 against an opposing force provided by a spring 24. Several ports are connected in fluid communication with the cylindrical opening in which the spool member 18 is disposed. Axial movement of the spool member 18 causes the ports to be placed in fluid communication with other ports to selectively control the flow of fluid through the valve body 16.

With continued reference to FIG. 1, it should be understood that the precise configuration of the ports in the valve body 16 is not a limiting characteristic of the present invention. In addition, the precise means for causing the spool member 18 to move axially within the valve body 16 is also not limiting to the scope of the present invention. Alternative means for actuating and de-actuating the spool member 18 can be accommodated by the present invention.

If the spool member 18 is caused to move toward the right in FIG. 1, the spring 24 will be compressed and the cylindrical outer surface of the spool member 18 will slide relative to the plurality of seals, such as O-rings 28, that are disposed in a fixed position relative to the valve body 16 and a moveable position relative to the spool member 18. A valve such as that shown in FIG. 1 is typically arranged in association with other apparatus and devices in a manner which results in a fail safe operation of the total system. In other words, if a power failure occurs and the coil 12 is deprived of electrical power, the plunger 14 will return to its unactuated position in response to the urging of spring 30. This will cause the maintenance of pressure in chamber 22 to cease and, as a result, the spool member 18 will return towards its leftmost position in response to an expansion of spring 24. However, as described in detail above, the spool member 18 may adhere to stationary components within the valve body 16 and remain in its actuated position toward the right even though spring 24 urges its return toward its unactuated position. This type of failure is more likely to occur in applications where the spool member 18 remains in its actuated position for extremely long periods of time without being cycled back and forth within the valve body 16.

FIGS. 2 and 3 are highly schematic representations of valves that will be used to describe the basic operation of a solenoid pilot valve so that the operation of the present invention, which will be described in greater detail below, will be more clearly understood. Within the valve body 16, a spool member 18 is disposed for axial movement between a first position and a second position within the valve body 16. A pilot valve 10 is provided with a solenoid coil 12 and electrically conductive leads 16 which can provide electrical power to the coil. Within the housing of the pilot valve 10, a plunger 14 is disposed for reciprocal movement from left to right in response to an electromagnetic field provided by the coil 12. When the plunger 14 is caused to move toward the left by the electromagnetic force provided by coil 12, fluid under pressure is permitted to flow into port 40 as represented by the arrows in FIG. 2. Since the plunger 14 is moved toward the left, a seal 42 is removed from contact with an orifice 44 and the fluid is free to flow, as indicated by the arrows, into the chamber 22 at the front face of motor 20. This causes the spool member 18 to move toward the right against the opposing force provided by spring 24. To facilitate the movement described above, an exhaust opening 46 is provided to permit fluid to flow from the valve body 16 and out of a chamber at the back side of the motor 20.

FIG. 3 shows the spool valve and pilot valve in an unactuated condition. The coil 12 is deprived of electrical current and therefore no electromagnetic field is available to urge the plunger 14 toward the left. In response to the force of a spring (not shown in FIGS. 2 and 3), the plunger 14 is urged to the right and inlet port 40 is blocked by the seal 42. Another seal 50 on the plunger 14 is moved away from an exhaust port orifice 54. This movement of plunger 14 connects the chamber 22 with atmospheric pressure while depriving it from fluid communication with a pressure source at port 40. With no pressure urging the spool member 18 toward the right, spring 24 causes the spool member to move toward its extreme left most position and move the fluid out of chamber 22.

With reference to both FIGS. 2 and 3, it should be understood that when coil 12 is energized the spool member 18 is forced toward the rightmost position as illustrated in FIG. 2 and when the coil 12 is de-energized the spool member 18 is caused to move toward its leftmost position. The problems described above can occur when the spool remains in the condition shown in FIG. 2 for extended periods of time and the spool member 18 adheres to stationary components within the valve. If this occurs, the spool member 18 will stick in the position shown in FIG. 2 even when the coil 12 is deprived of electrical power and the plunger moves toward the right in the pilot valve. If the spool member 18 adheres to stationary components in the manner described above, the valve looses its fail safe capability and disastrous consequences can occur. The present invention provides a means for determining whether or not the valve shown in FIG. 2 is capable of returning to the state shown in FIG. 3, but the present invention does not require actually causing a change in the fluid conduction state of the valve.

With continued reference to FIGS. 2 and 3, it can be seen that a magnetically sensitive component 60 is disposed proximate the spool member 18 at a predetermined location within the valve body 16. The magnetically sensitive component 60 is attached to a portion of the valve body 16 and, in a preferred embodiment of the present invention, is a Hall effect sensor. The preferred embodiment of the present invention also comprises a magnet 62 attached to the spool member 18. When the spool member 18 is in its fully actuated position against a travel limit, as shown in FIG. 2, the magnet 62 is removed away from the detection zone of the magnetically sensitive device 60. It should be understood that the positions of the magnetically sensitive device 60 and magnet 62 are chosen so that the magnetic field provided by permanent magnet 62 can be detected by the magnetically sensitive device 60 prior to the movement of the spool member 18 to its leftmost travel limit that is illustrated in FIG. 3. In other words, as the spool member 18 moves from its position shown in FIG. 2 toward its position shown in FIG. 3 the magnetic field provided by the permanent magnet 62 will be detected by the magnetically sensitive device 60 prior to the completion of that movement as a result of the preselected positions of the magnet and magnetically sensitive device.

With continued reference to FIGS. 2 and 3, it can be seen that if the plunger 14 is moved from its actuated position in FIG. 2 to its unactuated position in FIG. 3 for a very brief period of time and then quickly returned to its actuated position of FIG. 2, the gas in chamber 22 will begin to move toward exhaust port 70 and the axial force exerted against the motor 20 of the spool member 18 will begin to decrease. If the plunger 14 remains in the unactuated position for a sufficiently long time period, all of the air in chamber 22 will escape and the spring 24 will force the spool member 18 toward the left. However, if the period of time during which the coil 12 is deactuated is sufficiently short, the spool member will not move all the way to its leftmost period of travel. In fact, if the period of time of deactuation of the coil 12 is extremely short, the spool member 18 will not even move away from its rightmost limit of travel. By carefully controlling the period of time that the plunger 14 is in its unactuated position of FIG. 3, the degree of movement of the spool member 18 can be regulated from an extreme condition of no movement to an opposite extreme condition of complete movement toward the left. The present invention provides a means by which the coil 12 can be sequentially deactuated for brief intervals with each interval being slightly longer than its immediately previous interval until the spool member 18 moves a preselected distance away from its rightmost limit of travel. The magnet 62 and Hall effect device 60 are located at positions which indicate the movement of the spool member 18 past a predetermined location determined by the position of the magnetically sensitive device 60, wherein the predetermined location requires movement of the spool member away from its rightmost position but not all the way to its leftmost position.

Figure 4:
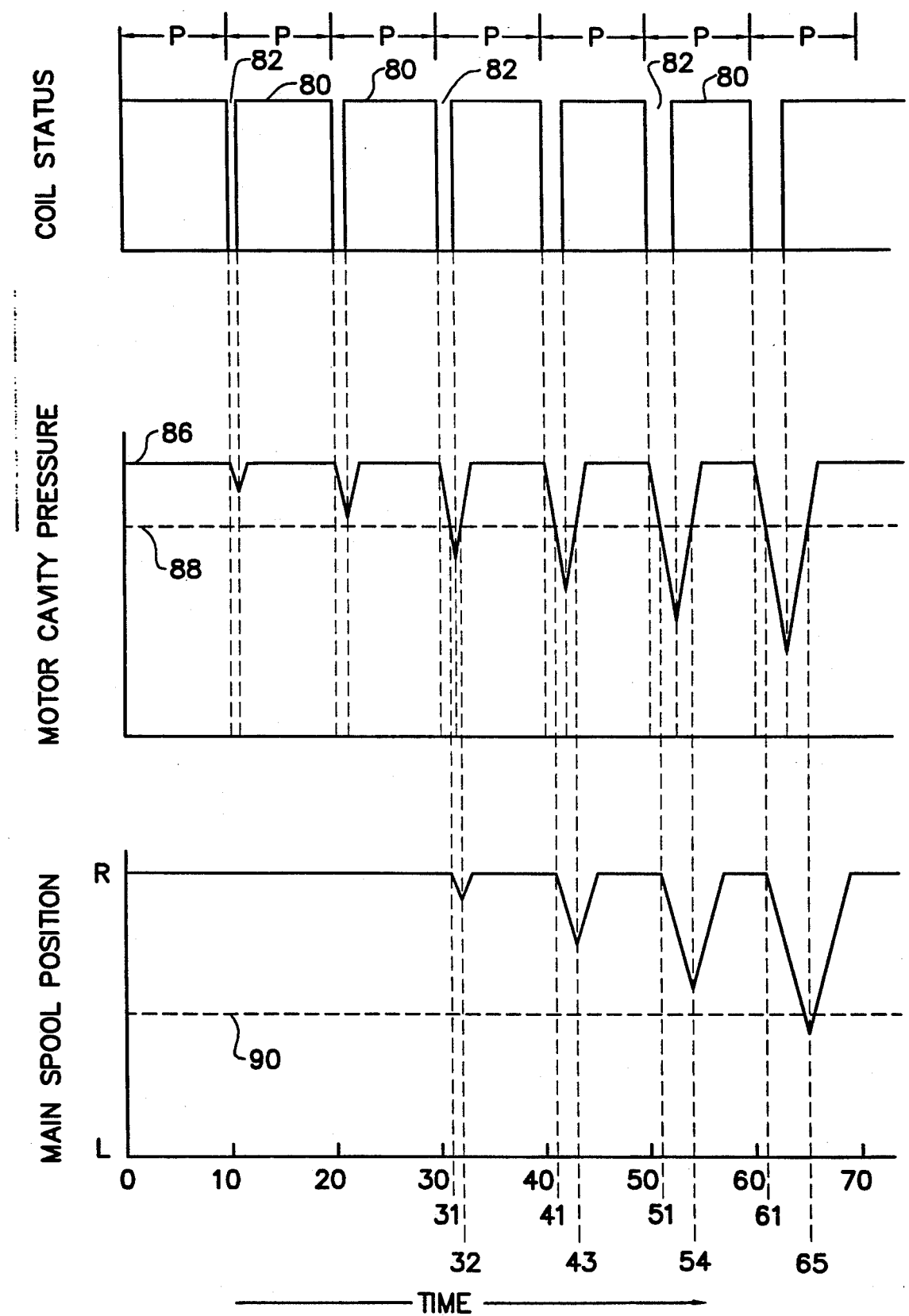
FIG. 4 comprises a series of graphical representations of coil status, motor cavity pressure and main spool position during the operation of the present invention.

FIG. 4 is a graphical representation of three variable parameters. The upper illustration in FIG. 4 represents the coil status, either energized or de-energized. The horizonal axis in FIG. 4 represents time and, in a particularly preferred embodiment of the preferred embodiment of the present invention, the of the coil is performed with constant time periods P being divided between actuation time 80 and deactuation time 82. As can be seen, the interval 82 of deactuation is successively increased for each subsequent timeperiod P.

The middle illustration in FIG. 4 represents the motor cavity pressure within chamber 22 shown in FIG. 2. When at full pressure 86, the spool member 18 is forced to its extreme rightmost limit of travel as represented in FIG. 2. The graphical representation of motor cavity pressure illustrates a series of occurrences where the motor cavity pressure decreases momentarily from full pressure to a magnitude less than full pressure. Dashed line 88 represents the pressure magnitude required in cavity 22 to provide a force which counteracts the spring force provided by spring 24. Therefore, when the motor cavity pressure decreases to a magnitude less than that indicated by dashed line 88, the spring 24 is able to cause the spool member 18 to move away from its rightmost limit of travel which is illustrated in FIG. 2.

With continued reference to FIG. 4, the bottom illustration shows the spool member 18 position. When full motor cavity pressure is available in chamber 22, the spool member 18 is at its rightmost limit of travel. However, if the motor cavity pressure falls below dashed line 88, spring 24 is able to urge the spool member 18 toward the left away from its rightmost limit of travel. The degree to which the spring 24 is able to move the spool member 18 toward the left away from its limit of travel is a function of the time period during which the motor cavity pressure is less than dashed line 88. The horizontal axes in FIG. 4 represent time measured in arbitrary time units which will be used herein solely for the purpose of identifying points of time in FIG. 4.

During the first time period illustrated in FIG. 4, between times 0 and 10, the coil 12 remains actuated during the entire period P. Then, during the second time period P, the coil 12 is deactuated for a very short interval 82 and then quickly reactuated for the remaining portion of the second timeperiod P. During this brief interval of deactuation, at approximately the 10th time unit in FIG. 4, the motor cavity pressure 86 drops by a very small amount and, as soon as the coil is again actuated, the motor cavity pressure again rises to its full magnitude. Since the pressure did not fall below dashed line 88, no main spool position change occurs. This is also true for the second brief interval of deactuation at time unit 20. It should be understood that each interval of deactuation of coil 12 is slightly longer than its most recent preceding interval of deactuation. In other words, the interval at time unit 20 is slightly greater than that at time unit 10. Eventually, as represented by the interval of deactuation at time unit 30, the length of the interval is sufficient to cause the motor cavity pressure to fall below the magnitude represented by dashed line 88. As a result, the spool member 18 will move away from its rightmost position by some small amount. If the succeeding interval of deactuation is again increased, as represented by the interval 82 which begins at time unit 40, the motor cavity pressure will again fall by a slightly greater degree and will again reach a magnitude below dashed line 88. Since the motor cavity pressure will be less than dashed line 88 for a slightly increased period of time, the main spool position will be affected to a slightly greater degree than the occurrence at time unit 30. As successive intervals of deactuation 82 are continually increased, the effect on the motor cavity pressure is also increased and the time during which the motor cavity pressure is less than the actuation magnitude 88 is increased As a result, the distance from the rightmost limit of travel R that the spool member 18 moves is increased as represented by the bottom illustration in FIG. 2. It should be understood that the movement represented by the bottom illustration in FIG. 4 shows that the spool member does not move to its extreme leftmost limit of travel L during the occurrences represented in FIG. 4. In addition, the present invention does not attempt to cause the spool member 18 to move a distance which would be sufficient to change the fluid conduction status of the valve. All of the movements represented in FIG. 4 are less than the movement required to change valve status and each movement is immediately followed by a return to the full actuation status of the valve. In other words, although the spool member 18 is caused to move briefly away from its rightmost limit of travel shown in FIG. 2, it immediately returns to that rightmost limit of travel after the brief interval of deactuation of coil 12. The position of the magnetically sensitive device 60 is chosen to require spool movement but not permit a change in valve status. Eventually, as represented by the change in the main spool position which occurs at approximately time unit 65, the spool member 18 moves away from its rightmost limit of travel by an amount sufficient to place the permanent magnet 62 within the detection zone of the magnetically sensitive device 60. This location, where the magnet 62 moves into the zone of detection of magnetically sensitive device 60, is represented by dashed line 90 in FIG. 4. When the permanent magnet 62 moves within the detection zone of the magnetically sensitive device 60, an output signal is provided which indicates that the spool member has been moved past the preselected location. Although the conduction state of the valve has not been affected by the procedures described above in conjunction with FIG. 4, the magnetically sensitive device 60 has provided a signal which indicates the spool member 18 is, indeed, movable and has not adhered permanently to stationary portions of the valve. This receipt of an output signal from the magnetically sensitive device 60 confirms that the valve has not failed in the insidious mode described above and, if the valve is deprived of electrical power, it will deactuate in a fail safe manner as intended. As described above, the present invention provides an efficient means to test the moveability of the spool member without having to move the spool member by a magnitude that would be sufficient to change the fluid conduction state of the valve.

Figure 5:
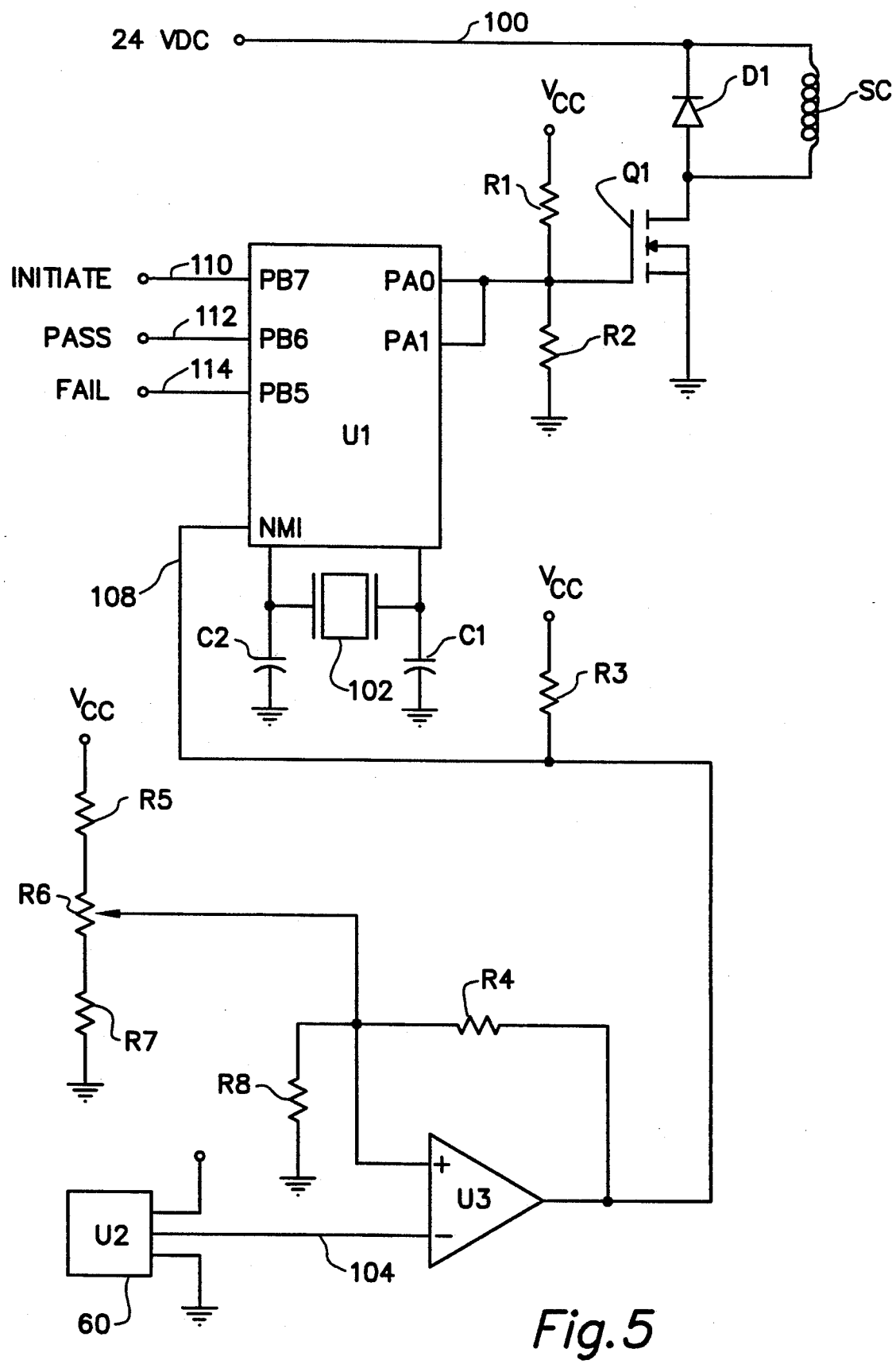
FIG. 5 shows an electronic circuit that can be used to implement the procedures of the present invention.

FIG. 5 illustrates an electrical circuit arrangement that can be used to perform the procedures described above. The coil 12 shown in FIGS. 1, 2 and 3 is schematically represented in FIG. 5 and identified as SC. A 24 volt DC supply provides electrical power to the coil SC on line 100. If field effect transistor Q1 is in a conducting state, the electrical current through coil SC is provided with a completed path to the power supply and the coil SC remains energized. As described above, this energization of coil SC causes the spool member to move to its rightmost limit of travel as shown in FIG. 2. The present invention provides a microprocessor U1 which is operatively associated with the gate connection of field effect transistor Q1 as shown. This enables the microprocessor U1 to momentarily deprive the coil SC of its return path to the power supply and therefore deactuate coil 12 of the pilot valve. The microprocessor is provided with a clock, such as crystal oscillator 102, in order to permit it to measure the required precise intervals of time described above. In a preferred embodiment of the present invention, the magnetically sensitive device 60 is a Hall effect element U2 as shown in FIG. 5. A comparator circuit, comprising an operational amplifier U3 and resistors R4, R5, R6, R7 and R8, is used to generate an output signal on line 104 when permanent magnet 62 moves into the detection zone. This provides the signal to the nonmasked interrupt NMI of microprocessor U1 on line 108. The set point of the comparator may be adjusted by means of resistor R6. This, in turn, adjusts the magnitude of spool member travel required before the function check procedure is terminated. This has the effect of varying the position of line 90 in FIG. 4C. The microprocessor also has an input, on line 110, which permits an operator to cause the microprocessor to execute the present invention's function check routine. Outputs, on lines 112 and 114, permit the microprocessor U1 to indicate a pass or fail result of the test.

TABLE I

| Reference | Type or value |
| --- | --- |
| C1 | 20 picofarad |
| C2 | 20 picofarad |
| D1 | IN4937 (National Semiconductor) |
| Q1 | MTD5N05-1 (Motorola) |
| R1 | 1KΩ |
| R2 | 10KΩ |
| R3 | 10KΩ |
| R4 | 121KΩ |
| R8 | 10KΩ |
| R5 | 10KΩ |
| R6 | 20KΩ |
| R7 | 56KΩ |
| U1 | ST6220(SGS-Thomson) |
| U2 | SS94A1 (Honeywell) |
| U3 | 258 (Texas Instruments) |

TABLE I-continued

| Reference | Type or value |
|---|---|
| 102 | 8MHz |

Figure 6A:
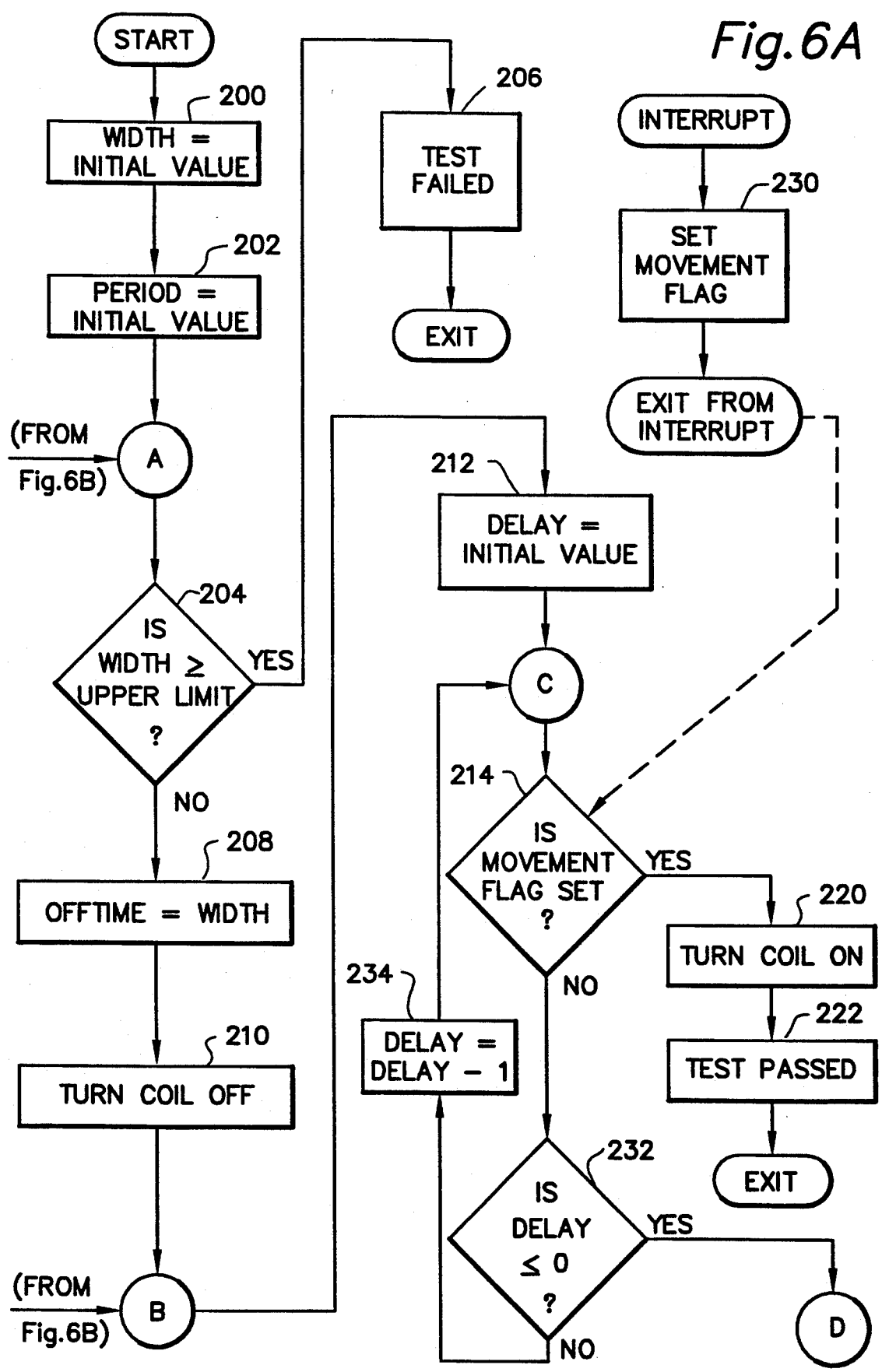
FIGS. 6A and 6B are a flow chart of a software routine that is executable by the microprocessor used in a preferred embodiment of the present invention.
Figure 6B:
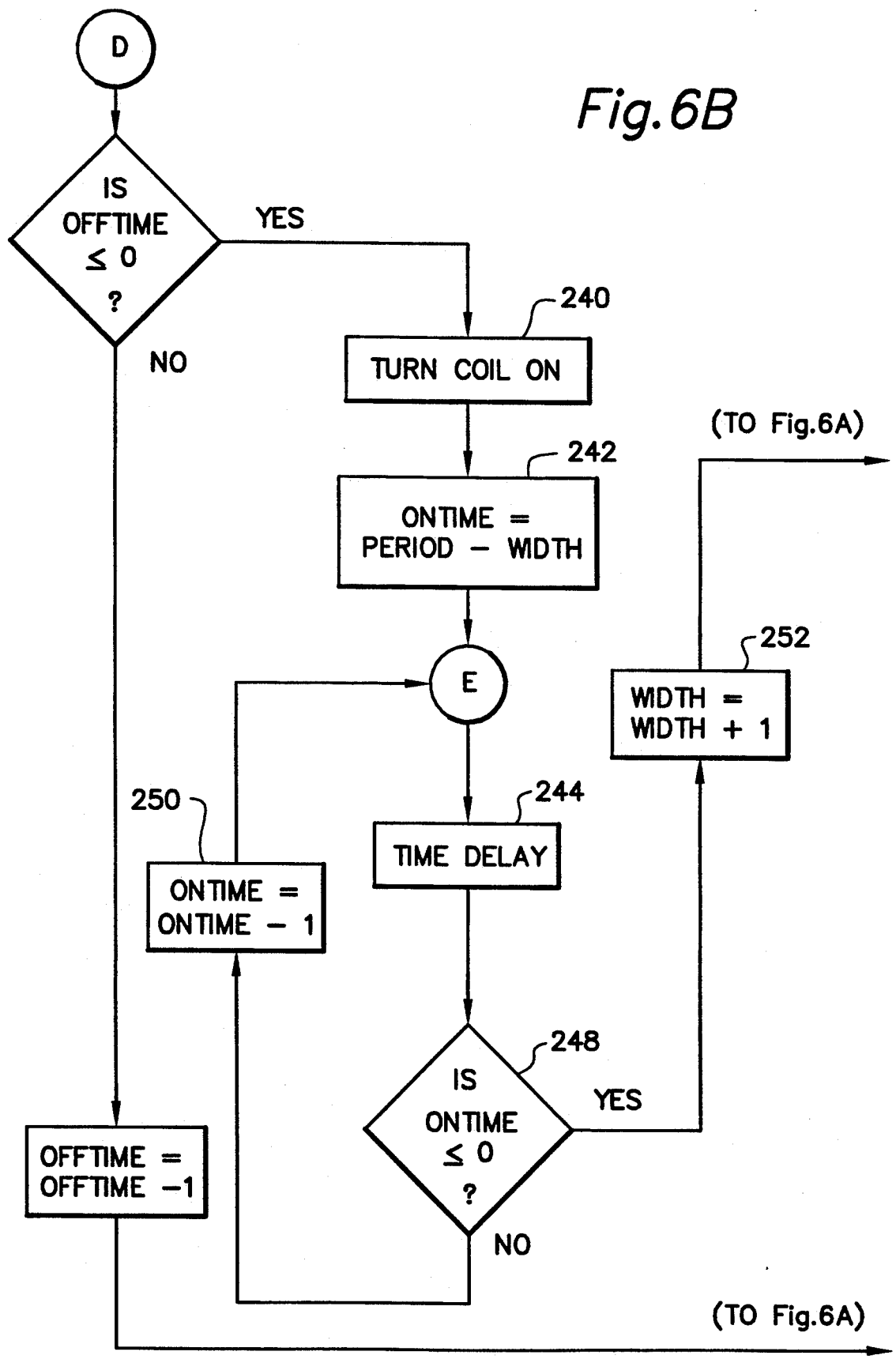

FIG. 6A and 6B show an exemplary flow chart of a computer program that can be implemented in conjunction with microprocessor U1 in FIG. 5. However, it should be clearly understood that alternative software routines can be used to perform the functions related to the present invention.

When the program in FIGS. 6A and 6B is initiated it first initializes a WIDTH variable and a PERIOD variable as shown in functional blocks 200 and 202. Then, it checks to determine whether or not the WIDTH variable has exceeded an upper limit. If the WIDTH variable has exceeded the upper limit, as determined at functional block 204, the test will be determined to have failed and appropriate action will be taken as represented by functional block 206. If, on the other hand, the WIDTH has not exceeded the upper limit, it is used as a period of time during which the coil 12 will be deactuated. This value of WIDTH is stored in a variable called OFFTIME, as indicated at functional block 208. Then the solenoid coil 12 is deprived of electrical power at functional block 210 which is accomplished by placing field effect transistor Q1 in a nonconducting state. Beginning at location B in FIGS. 6A and 6B, the program sets a DELAY variable to an initial value and begins monitoring a MOVEMENT flag. These steps are shown in functional blocks 212 and 214, respectively. If the MOVEMENT flag is set, the coil 12 is actuated at functional block 220 and the test is determined to have passed at functional block 222. As shown in FIGS. 6A and 6B, the NMI input of microprocessor U1 provides an interrupt when the Hall effect device indicates the effects of the permanent magnet 62 and provides a signal on line 104. When that interrupt is received, the MOVEMENT flag is set at functional block 230 and that flag is examined at functional block 214. If the MOVEMENT flag is not set, the software continues to monitor the DELAY variable at functional block 232 and to decrement the DELAY variable at functional block 234. If the DELAY variable has been decremented to zero, the program begins to execute the portion of the routine beginning at point D. It checks the OFFTIME variable and, if the OFFTIME variable has been decremented to zero, the coil is again turned on at functional block 240 and the ONTIME variable is set to the remaining portion of time of the PERIOD. This is shown at functional block 242. Beginning at program location E, a time delay is executed at functional block 244 and an ONTIME variable is continually checked at functional block 248 and decremented at functional block 250. If the ONTIME variable is decremented to zero, the WIDTH variable is incremented as functional block 252 and the program again returns to program location A.

With continued reference to FIGS. 6A and 6B, it can be seen that the software described by the flow chart measures fixed timeperiods P as shown in FIG. 4 and determines the length of time when the coils should be de-energized. The remaining portion of the PERIOD variable is used as the time when the coil should be energized. While the coil is de-energized, the program continually checks to see is the MOVEMENT flag is set to indicate the receipt of a signal from the Hall effect sensor which indicates that the spool member 18 has moved the prerequisite amount to designate a test pass condition. Upon each interaction of the main portion of the flow chart in FIGS. 6A and 6B, the OFFTIME variable is increased to enlarge the de-energized interval 82 for each successive period. This is done until either the spool member moves or the determination of the WIDTH variable has exceeded a maximum acceptable length of time. It should be understood that during the entire execution of the software routine represented by the flow chart in FIGS. 6A and 6B, the spool member 18 does not move by a sufficient distance to change the fluid conduction state of the valve. Therefore, related equipment and apparatus are not affected in any way by this procedure.

The procedure represented by the flowchart of FIGS. 6A and 6B, can be initiated manually or automatically. If it is initiated automatically, it can be performed on a regular basis to guarantee the proper operation of the valve. In a preferred embodiment of the present invention, the duration of the intervals 82 is sufficiently small to perform the entire sequence in a few seconds. Under these conditions, the procedure represented in FIGS. 6A and 6B can be performed as often as desired to assure proper operation of the valve.

Although the present invention has been described with particular specificity and illustrated to show a preferred embodiment in significant detail, it should be understood that alternative embodiments of the present invention are within its scope. For example, use of the present invention is not limited to valves which axially move a spool member within a valve housing. Alternative actuators can be monitored in a similar way, the magnetically sensitive device can be another type of device instead of a Hall effect sensor. Furthermore, it should be understood that the sequential steps performed by the microprocessor and its related software could be implemented in a hardware embodiment that does not require the use of a microprocessor.

The embodiments of the invention in which an exclusive property or right is claimed are defined as follows:

1. A valve, comprising:
    a spool member movable between a first position at a first limit of travel in a first direction and a second position at a second limit of travel in a second direction;
    means for causing said spool member to move a partial distance from said first position toward said second position;
    means for sensing a movement of said spool past a predetermined location intermediate said first and second positions;
    a pilot valve operatively associated with said spool, said pilot valve comprising a moveable plunger; and
    a solenoid coil for moving said plunger between an energized position and a de-energized position, said energized position urging said spool to move toward said first position, said de-energized position urging said spool to move toward said second position; and
    said causing means comprising a means for de-energizing said solenoid coil for sequential increasing intervals until said spool moves past said predetermined location.

2. The valve of claim 1, wherein:
    said sensing means comprises a Hall element disposed proximate said spool member at said predetermined location and a magnet attached to said spool member.

3. The valve of claim 1, further comprising:
means for adjusting said predetermined location.

4. A valve, comprising:
means for repeatedly moving a spool member of said valve a variable distance from a first position toward a second position;
means for increasing said variable preselected distance for each successive movement of said spool member; and
means for sensing the movement of said spool member past a predetermined location.

5. The valve of claim 4, wherein:
said moving means comprises a pilot valve operatively associated with said spool member to control an actuation pressure which urges said spool member toward said first position.

6. The valve of claim 4, wherein:
said sensing means comprises a Hall element disposed proximate said spool at said predetermined location.

7. The valve of claim 6, wherein:
said sensing means comprises a magnet attached to said spool member.

8. The valve of claim 4, wherein:
said moving means comprises a solenoid coil and a plunger disposed within said solenoid coil.

9. The valve of claim 8, wherein:
said increasing means comprises a means for regulating the duration of periods of de-energization of said solenoid coil.

10. A method for determining the operability of a valve, comprising:
moving a spool member of said valve a variable preselected distance from a first position toward a second position;
increasing said variable distance for each successive movement of said spool member; and
sensing the movement of said spool member past a predetermined location.

11. The method of claim 10, wherein:
said moving step is repeated at a constant frequency.

12. The method of claim 10, wherein:
said moving step is repeated at a variable frequency.

13. The method of claim 10, wherein:
said moving step comprises the steps of de-energizing a solenoid coil of a pilot valve for a variable preselected time period.

14. The method of claim 10, wherein: said sensing step comprises the step of monitoring an output signal of a Hall effect sensor.

* * * * *